US006721369B1

(12) United States Patent
Hash et al.

(10) Patent No.: US 6,721,369 B1
(45) Date of Patent: Apr. 13, 2004

(54) COMPOSITE BPSK/AM-BPSK BASED SPECTRAL SUPPRESSION OF OUT-OF-BAND ENERGY FROM SATURATED RF AMPLIFIER

(75) Inventors: Ronald J. Hash, Rogersville, TN (US); Donald K. Belcher, Rogersville, TN (US)

(73) Assignee: Wherenet Corp, Santa Clara, CA (US)

( * ) Notice: Subject to any disclaimer, the term of this patent is extended or adjusted under 35 U.S.C. 154(b) by 0 days.

(21) Appl. No.: 09/436,551

(22) Filed: Nov. 9, 1999

Related U.S. Application Data

(60) Provisional application No. 60/107,649, filed on Nov. 9, 1998.

(51) Int. Cl.[7] .......................... H04K 1/02; H04L 25/03; H04L 25/49
(52) U.S. Cl. ....................................... 375/296; 375/297
(58) Field of Search ............................... 375/296, 260; 455/108; 341/152; 330/10

(56) References Cited

U.S. PATENT DOCUMENTS

| | | | |
|---|---|---|---|
| 5,886,573 A | * 3/1999 | Kolanek | 330/10 |
| 5,930,687 A | * 7/1999 | Dapper et al. | 455/108 |
| 6,373,827 B1 | * 4/2002 | Tayebi et al. | 370/310 |
| 6,373,902 B1 | * 4/2002 | Park et al. | 375/296 |

* cited by examiner

Primary Examiner—Stephen Chin
Assistant Examiner—Curtis Odom
(74) Attorney, Agent, or Firm—Allen, Dyer, Doppelt, Milbrath & Gilchrist, P.A.

(57) ABSTRACT

An amplitude modulation (AM) based mechanism controllably alters the shape of a binary phase shift keyed (BPSK) digital spreading waveform modulated onto an RF carrier. The modulated RF carrier is amplified by a saturated RF amplifier. The spectral properties of the amplified AM-BPSK waveform, when combined with the spectral properties of a BPSK waveform modulated onto the RF carrier and amplified by another saturated RF amplifier, produces a composite BPSK-modulated RF waveform containing substantially suppressed sidelobes.

18 Claims, 3 Drawing Sheets

COMPOSITE BPSK/AM-BPSK BASED SPECTRAL SUPPRESSION OF OUT-OF-BAND ENERGY FROM SATURATED RF AMPLIFIER

CROSS-REFERENCE TO RELATED APPLICATIONS

The present application claims the benefit of previously filed Provisional Patent Application, Ser. No. 60/107,649, filed Nov. 9, 1998.

FIELD OF THE INVENTION

The present invention relates in general to communication systems, and is particularly directed to an amplitude modulation (AM) based mechanism for controllably altering the shape of a binary phase shift keyed (BPSK) digital spreading waveform to be modulated onto an RF carrier and amplified by a saturated RF amplifier. The spectral properties of an RF carrier modulated with the AM-BPSK waveform and amplified by a saturated RF amplifier, when combined with the spectral properties of an RF carrier modulated with the BPSK waveform and amplified by a saturated RF amplifier, produce a composite AM-BPSK/BPSK modulated RF waveform containing substantially suppressed sidelobes.

BACKGROUND OF THE INVENTION

The need for increased capacity accompanying the expansion of the wireless communications market has resulted in a move away from traditional analog modulation techniques, such as frequency modulation (FM), to digital modulation formats, such as time division multiple access (TDMA), code division multiple access (CDMA) and direct spread spectrum (DSS) waveforms. Although reasonably priced RF output amplifiers are capable of providing the relatively high degree of linearity such waveforms require, they do so at a low and practically unacceptable power usage efficiency (e.g., on the order of only fifteen percent). To realize the more acceptable efficiencies (e.g., on the order of 35–75%) that are obtainable from such amplifiers, it is necessary to operate the amplifiers in their saturation regions. Unfortunately, the non-linear distortion associated with operating the RF amplifier at saturation causes spectral regrowth—pushing a non-insignificant amount of amplified energy outside a prescribed relatively narrow bandwidth (such as that mandated by FCC requirements).

Conventional approaches to solve this problem have included both pre- and post-amplifier filters. Pre-amplification filtering only affects the input to the amplifier; spectral regrowth still occurs, forcing the use of a non-saturated amplifier. A post filter, on the other hand, serves to remove spectral energy outside the intended bandwidth. Unfortunately, this has the undesired effect of introducing loss after the amplifier, which impacts overall transmitter efficiency, and thereby mitigates against the reason for operating the amplifier at saturation in the first place.

SUMMARY OF THE INVENTION

In accordance with the present invention, the above-described spectral regrowth problem is successfully addressed by controllably altering the shape of (amplitude modulating (AM)) a (binary phase shift keyed (BPSK) digital spreading) waveform to be modulated onto an RF carrier and amplified by a saturated RF amplifier. The spectral properties of the RF carrier when modulated with the AM-BPSK waveform and amplified by a saturated RF amplifier are different from the spectral properties of a similarly amplified RF carrier modulated with the BPSK waveform that has not been subjected to the amplitude modulation. This difference is such that, when the two modulated and amplified waveforms are combined, the spectral properties of the resulting composite modulated and amplified RF carrier contain substantially suppressed sidelobes.

For this purpose, pursuant to a non-limiting embodiment of the invention, a digital spreading sequence to be modulated onto a transmitted RF carrier is converted into a BPSK waveform. The BPSK waveform is applied to first and second modulation paths of an RF carrier modulator. One of the paths through the RF carrier modulator is coupled directly to a first RF carrier mixer, while a second path through the modulator is coupled to an amplitude modulating switch, that is installed upstream of a second RF carrier mixer. The amplitude modulating switch is operative to modulate the amplitude of the BPSK waveform in accordance with an amplitude modulating or 'chopping' signal. This chopping signal may be readily generated by processing the digital spreading sequence and its associated clock, so that the chopping signal opens the amplitude modulating switch for a prescribed interval—beginning prior to and concluding after each transition in a delayed version of the BPSK waveform. This has the effect of selectively reducing portions of the amplitude of the BPSK waveform to zero on either side of its phase transitions between 0°/180° and between 180°/0°.

The BPSK waveform in the first path, and the amplitude modulated (AM)-BPSK waveform produced by the amplitude modulating switch in the second path, are modulated onto an RF carrier by their respective mixers and then amplified in associated RF amplifiers, each operating at saturation. The outputs of the two saturated RF amplifiers are summed together to produce a composite signal that is transmitted. Because of the 'chopped' reductions in the amplitude of the AM-BPSK waveform on either side of relatively 'steep' transitions in the original BPSK signal, the AM-BPSK waveform has 'stepped' data transitions, that are effective to shift or modify its spectral properties relative to those of the original BPSK signal, which is not so chopped.

This causes a decrease in the total power during phase changes of a prescribed portion (e.g., one-half) of a chip. Spectral analysis reveals that the energy in sidelobes of the spectrum of the composite or combined (BPSK+AM-BPSK) amplified waveforms tends to be shifted or concentrated within the intended limited bandwidth of RF amplifier operation. In addition, the depths of the notches of the sidelobes of the composite AM-BPSK/BPSK spectrum are significantly suppressed. In contrast, most of the energy in the sidelobes of the unmodulated BPSK waveform per se, and in sidelobes of the AM-BPSK waveform falls outside this limited bandwidth.

DETAILED DESCRIPTION

Figure 1:
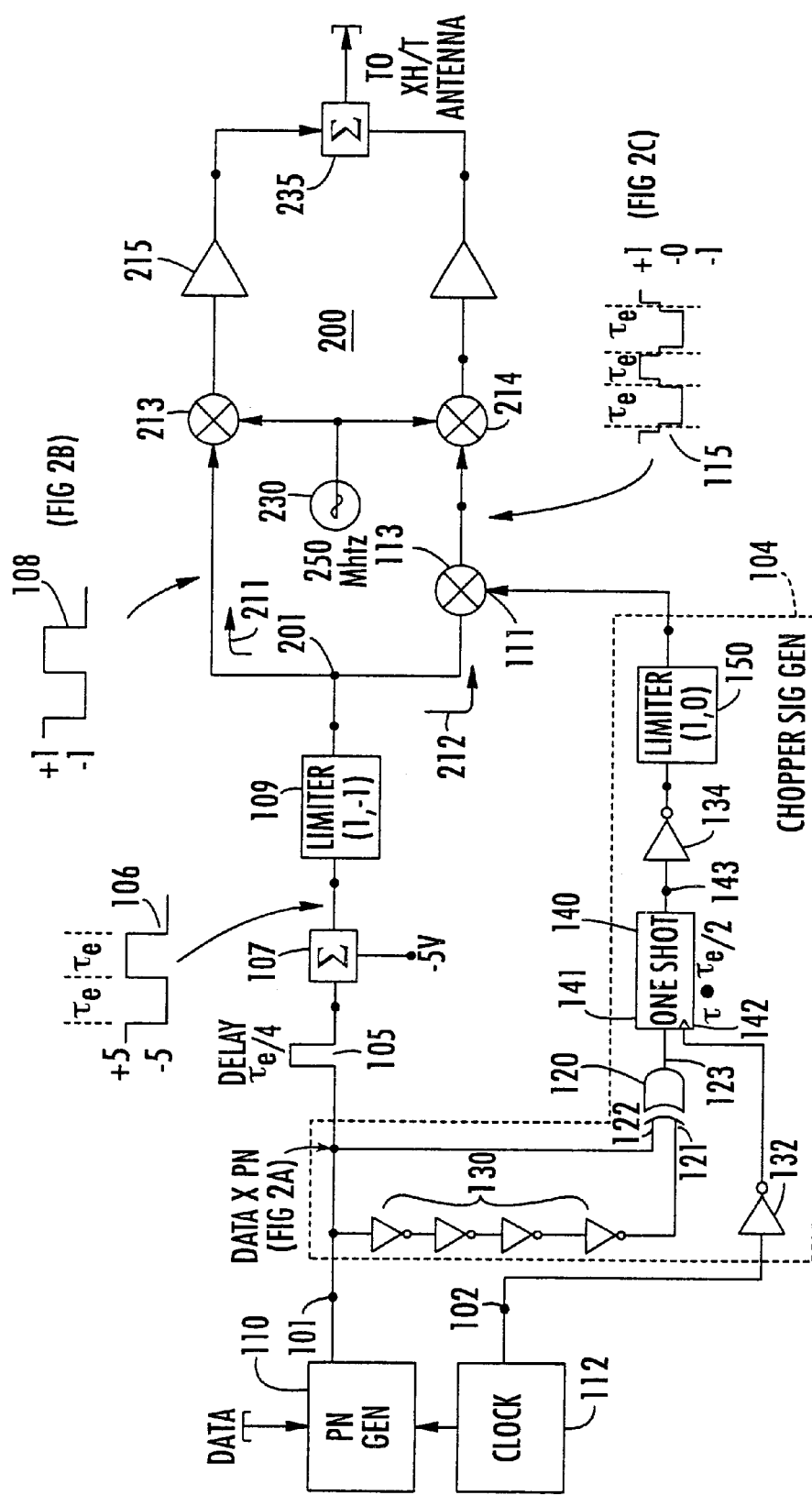
FIG. 1 diagrammatically illustrates a non-limiting example of an RF power amplifier architecture incorporating the AM-BPSK based sidelobe suppression mechanism of the present invention.

Before describing in detail the AM-BPSK based spectral regrowth suppression mechanism in accordance with the present invention, it should be observed that the present invention resides primarily in what is effectively a prescribed arrangement of conventional digital and RF amplifier circuitry components, together with associated signal processing components and attendant control circuitry therefor, that controls the operations of such associated signal processing components. As a consequence, the configuration of such circuitry and components, and the manner in which they are interfaced with other equipment have, for the most part, been illustrated in the drawings by a readily understandable block diagram, with associated signal timing and spectral diagrams, which show only those specific details that are pertinent to the present invention, so as not to obscure the disclosure with details which will be readily apparent to those skilled in the art having the benefit of the description herein. Thus, the block diagram is primarily intended to show the major components of a sidelobe suppression arrangement in a convenient functional grouping, whereby the present invention may be more readily understood.

FIG. 1 diagrammatically illustrates the architecture of a non-limiting example of an RF power amplifier circuit architecture, which incorporates the AM-BPSK based, sidelobe-suppression mechanism of the present invention. A non-limiting environment where the present invention has particular utility is an RF energy-based object location and tracking system, in which the locations of a variety of objects may be continuously identified by 'tagging' each object with a micro-miniaturized radio transmitter unit. Such a system may be of the type described in the U.S. Patent to D. Belcher et al, U.S. Pat. No. 5,920,287, entitled: "Radio Location System for Precisely Tracking Objects by RF Transceiver Tags Which Randomly and Repetitively Emit Wideband Identification Signals," assigned to the assignee of the present application and the disclosure of which is incorporated herein.

As described in that Patent, each tag transmitter repetitively and randomly transmits a spread spectrum burst within a limited (unlicensed) portion of the RF spectrum. The RF burst is encoded with information representative of the identification of the object and auxiliary parameter data, such as that provided by an external sensor. The system employs a plurality of geographically distributed tag burst receivers, that use correlation processing to accurately identify a first-to-arrive burst from a tag, and a multilateration algorithm to precisely identify the locations of the objects being tracked.

Figure 2:
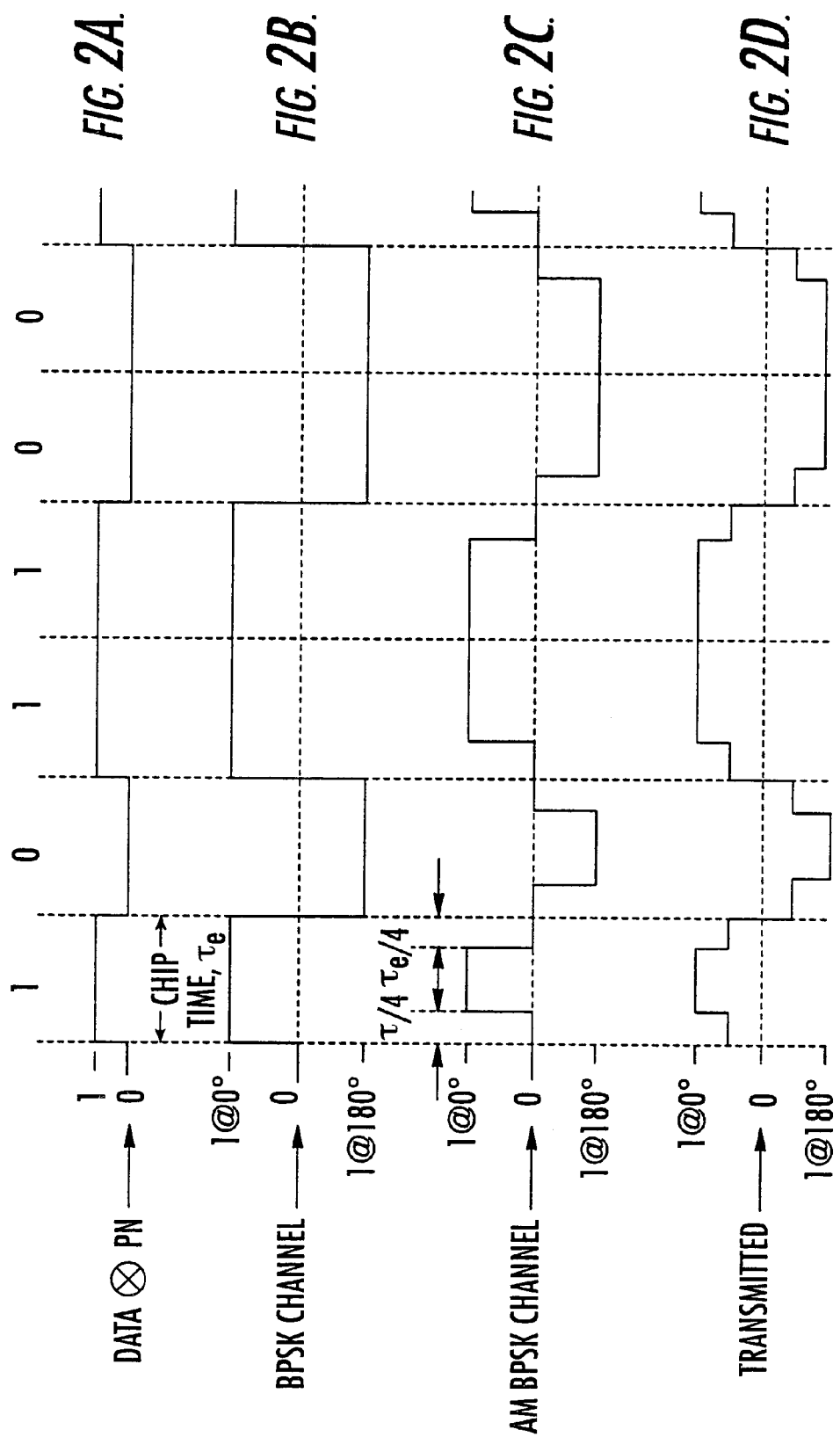
FIGS. 2A–2D are respective timing diagrams associated with the operation of the circuit architecture of FIG. 1.

In the suppressed sidelobe RF transmitter architecture of FIG. 1, an input port 101 thereof is coupled to receive an input signal, such as a digital PN code (spreading) sequence 110 representative of information symbols (e.g., tag identification data, as described in the above-referenced Belcher et al Patent) to be transmitted (shown in FIG. 2A). (For the non-limiting example of the above-referenced Belcher et al Patent, the PN generator may correspond to the high speed PN code generator shown at 73 in FIG. 4 of the Patent.) A second port 102 is coupled to receive a clock signal from a clock signal generator 112 associated with the generation of the digital spreading sequence produced by PN code sequence generator 110, and thereby provide clock signal transitions that are synchronized with the data transitions between successive binary states ('0' and '1') in the spread data sequence applied to the input port 101.

Each of the spreading sequence at input port 101 and the clock signal at clock port 102 is coupled to an amplitude modulation unit or signal level 'chopper' circuit 104. Chopper circuit 104 is operative to generate a switch control signal that is applied to the control port 111 of an amplitude modulating (AM) switch 113 installed in an amplitude modulation path of an RF carrier modulation unit 200. The characteristics of the switch control signal produced by the chopper circuit 104 are such as to turn off or interrupt the signal flow path through the AM switch 113 for a prescribed interval (e.g., one half of a data level period) beginning just prior to (e.g. one quarter of a data period) and concluding just after (e.g., one quarter of a data period of) each transition in a delayed version of the spreading signal.

For this purpose, as a non-limiting example, the chopper circuit 104 is shown as comprising an exclusive-OR gate 120, having a first input 121 coupled through a plurality of inverter stages 130 to the data port 101, and a second input 122 coupled directly to the data port 101. The output 123 of the exclusive-OR gate 120 is coupled to the D input 141 of a monostable multivibrator or 'one-shot' circuit 140. One-shot circuit 140 has a clock input 142 that is coupled through an inverter stage 132 to the clock port 102. The one-shot circuit 140 is operative to produce a monostable timing signal that provides a prescribed delay relative to a transition in the data signal at port 101. The output 143 of the one-shot circuit 140 is coupled through an inverter 134 and a hard-limiter 150 to the control port 111 of the AM switch 113.

The input port 101 is further coupled through a fixed delay circuit 105, that imparts a prescribed delay to the data signal (e.g. one quarter of a data period). The delayed data signal output of the fixed delay circuit 105 is coupled through a level shifter circuit 107, which is effective to produce a waveform 106 having data transitions between prescribed opposite polarity logic levels (e.g., +5 and −5 volts). The amplitude levels of the data signal are then reduced (e.g., to +1 and −1 volts) by a hard limiter 109, so as to produce what is effectively a binary phase shift keyed (BPSK) data waveform 108 (where +1 corresponds to a phase of 0° and −1 corresponds to a phase of 180°, as shown in FIG. 2B). This BPSK waveform is applied to an input port 201 of the RF carrier modulation unit 200.

Within the RF carrier modulation unit 200, the incoming BPSK waveform 108 is split into two paths 211 and 212. The first path 211 includes a first mixer 213 to which an RF carrier signal produced by an RF carrier generator 230 is supplied. The spreading BPSK-modulated RF carrier output of the mixer 213 is amplified in a first RF output amplifier 215, operating at saturation. The output of the RF amplifier 215 is supplied to a summing circuit 235. The second path 212 (the amplitude modulation path) includes a second mixer 214, to which the RF carrier signal produced by an RF carrier generator 230 is also supplied. The mixer 214 is coupled to receive the output waveform 115 produced by the AM switch 113, to which the BPSK waveform at input port 201 is coupled.

As described above, and as shown in the timing diagram of FIG. 2C, the switch control signal applied to the amplitude modulating switch 113 interrupts the BPSK waveform for a prescribed interval (e.g., one half of a data level period), beginning just prior to (e.g. one-quarter of a data period) and concluding just after (e.g., one-quarter of a data period of) each phase transition of the BPSK waveform, so that the phase transitions of the resulting AM-BPSK waveform are 'stepped' or 'softened. This causes a decrease in the total power during phase changes of a prescribed portion (e.g., one-half) of chip.

Figure 3:
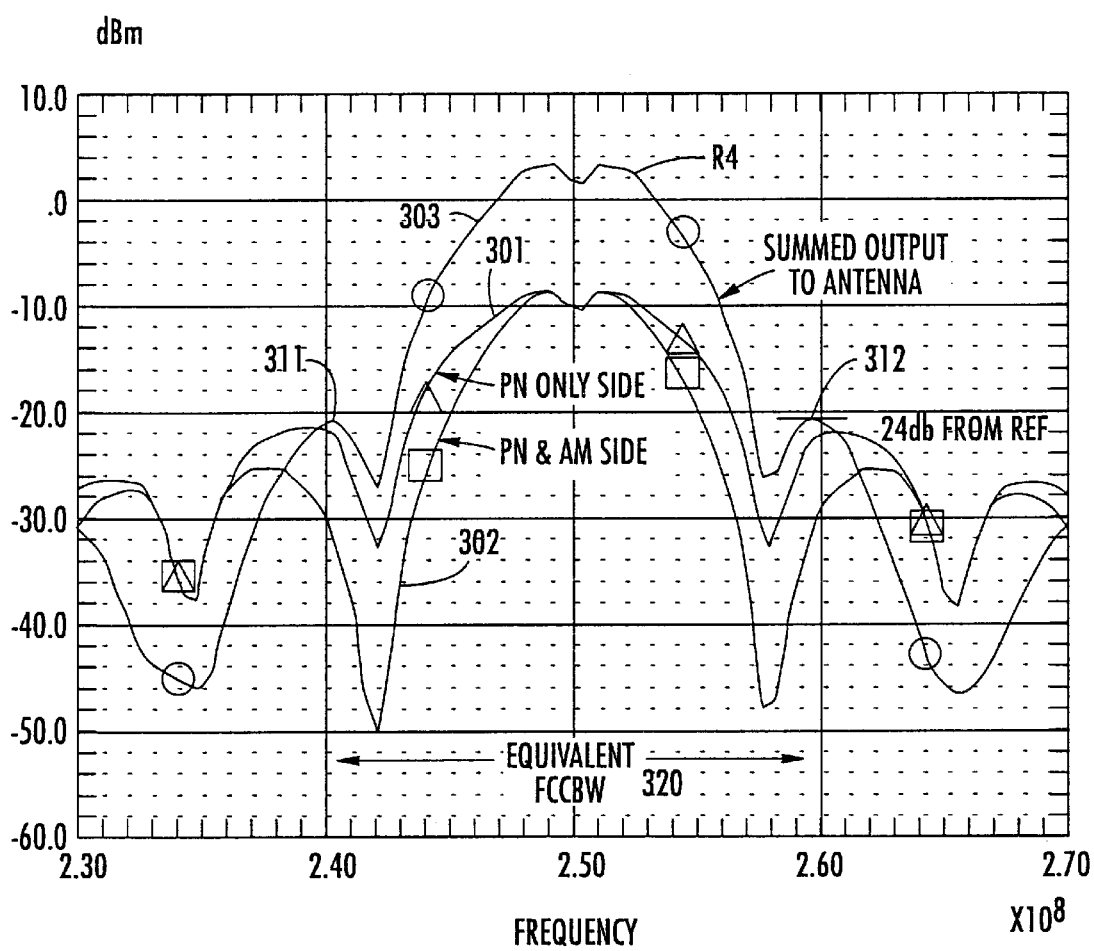
FIG. 3 contains a set of spectral diagrams showing the improved performance of the circuit architecture of FIG. 1.

As shown in the spectral diagram FIG. 3, this has the effect of changing the spectral properties of the AM-BPSK waveform, shown at 302, to those of the original (nonmodulated) BPSK waveform, shown at 301, which is not so chopped. As a consequence, the spectral characteristic 303 of the composite (BPSK+AM-BPSK) amplified waveform has sidelobes 311, 312 on either side of the main lobe significantly suppressed relative to the main lobe 310, compared with those of the spectral properties 301 and 302. Thus, most of the energy in the composite waveform falls within the limited bandwidth 320.

As further shown in the timing diagram of FIG. 2D, although combining the two amplified BPSK and AM-BPSK waveforms produces a waveform having stepped transitions between its respective 0° and 180° phase states, the duration of each stable portion of the composite waveform is still quite sufficient to allow accurate sampling at the midpoint of the bit interval for accurate data recovery. The post correlation implementation loss incurred is less than one dB and approximately equal to a pre-filter, as previously described.

As will be appreciated from the foregoing description, the spectral regrowth problem associated with operating an RF amplifier in its extremely non-linear but more efficient saturation mode is successfully addressed in accordance with the present invention by modifying the shape of the waveform to be amplified in a manner that substantially represses the energy content of spectral sidelobes of the amplified signal to a value that complies with prescribed bandwidth limitation.

As described above, the stepped transitions in the amplitude of the AM-BPSK waveform on either side of transitions in the original BPSK waveform reduces the total power during (0°/180°) phase changes thereof, and decreases the energy in spectral sidelobes of the spectrum of the summed BPSK and AM-BPSK amplified waveforms that fall outside the amplifier's limited operational bandwidth.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of amplifying a modulated radio frequency (RF) carrier waveform for RF transmission, said modulated RF carrier waveform containing transitions between first and second states comprising:
   (a) providing amplifier circuitry that is operative to amplify said modulated RF carrier waveform applied thereto for RF transmission; and
   (b) modifying the shape of said transitions of said modulated RF carrier waveform in a manner that is effective to substantially suppress energy content of spectral sidelobes outside an intended limited bandwidth of said amplifier circuitry upon RF transmission.

2. A method according to claim 1, step (a) comprises operating said amplifier circuitry in its saturation region.

3. A method according to claim 2, wherein said modulated RF carrier waveform comprises a binary phase shift keyed (BPSK) digital spreading waveform modulated onto an RF carrier.

4. A method according to claim 3, wherein step (b) comprises:
   (b1) modulating said BPSK waveform onto said RF carrier to produce a BPSK-modulated RF carrier waveform, said BPSK-modulated RF carrier waveform being amplified by an associated RF amplifier operating in its saturation region to produce an amplified BPSK-modulated RF carrier waveform,
   (b2) amplitude-modulating transition regions of said BPSK waveform to produce an amplitude modulated (AM)-BPSK waveform,
   (b3) modulating said AM-BPSK waveform onto said RF carrier to produce an AM-BPSK modulated RF carrier waveform, said AM-BPSK modulated RF carrier waveform being amplified by an associated RF amplifier operating in its saturation region to produce an amplified AM-BPSK modulated RF carrier waveform, and
   (b4) combining said amplified BPSK-modulated RF carrier waveform produced in step (b1) with said amplified AM-BPSK modulated RF carrier waveform produced in step (b3) to produce a modulated RF carrier waveform having a composite spectral characteristic in which energy content of spectral sidelobes is suppressed.

5. A method according to claim 4, wherein step (b2) comprises amplitude-modulating said BPSK waveform beginning prior to and concluding after each transition of said BPSK waveform.

6. A method according to claim 4, wherein step (b2) comprises reducing the amplitude of said BPSK waveform beginning prior to and concluding after each transition of said BPSK waveform.

7. An apparatus for amplifying a modulated radio frequency (RF)carrier waveform for RF transmission, said modulated RF carrier waveform containing transitions between first and second states comprising:
   amplifier circuitry that is operative to amplify said modulated RF carrier waveform applied thereto for RF transmission; and
   a modulator that is operative to modify the shape of said transitions of said modulated RF carrier waveform in a manner that is effective to substantially suppress energy content of spectral sidelobes outside an intended limited operational bandwidth of said amplifier circuitry upon RF transmission.

8. An apparatus according to claim 7, wherein said amplifier circuitry is operated in its saturation region.

9. An apparatus according to claim 8, wherein said modulated RF carrier waveform comprises a binary phase shift keyed (BPSK) digital spreading waveform modulated onto an RF carrier.

10. An apparatus according to claim 9, wherein said modulator comprises a first modulator that is operative to modulate said BPSK waveform onto said RF carrier to produce a BPSK-modulated RF carrier waveform, and wherein said amplifier circuitry includes a first RF amplifier operating in its saturation region, and being coupled to amplify said BPSK-modulated RF carrier waveform to produce an amplified BPSK-modulated RF carrier waveform, a second modulator that is operative to amplitude-modulate transition regions of said BPSK waveform to produce an amplitude modulated (AM)-BPSK waveform, a third modulator that is operative to modulate said AM-BPSK waveform onto said RF carrier to produce an AM-BPSK modulated RF carrier waveform, and a second RF amplifier operating in its saturation region and being operative to amplify said AM-BPSK modulated RF carrier waveform to produce an amplified AM-BPSK modulated RF carrier waveform, and further including a combiner which is operative to combine said amplified BPSK-modulated RF carrier waveform with said amplified AM-BPSK modulated RF carrier waveform to produce a composite modulated RF carrier waveform having a spectral characteristic in which energy content of spectral sidelobes is suppressed.

11. An apparatus according to claim 10, wherein said second modulator is operative to amplitude-modulate said BPSK waveform beginning prior to and concluding after each transition of said BPSK waveform.

12. An apparatus according to claim 10, wherein said second modulator is operative to reduce the amplitude of said BPSK waveform beginning prior to and concluding after each transition of said BPSK waveform.

13. An apparatus comprising:
- a first modulator that is operative to modulate a first waveform onto an RF carrier to produce a first modulated RF carrier waveform;
- a first RF amplifier operating in its saturation region, and being coupled to amplify said first modulated RF carrier waveform to produce a first amplified modulated RF carrier waveform having a first energy content in spectral sidelobes outside an intended limited bandwidth;
- a second modulator that is operative to amplitude-modulate transition regions of said first waveform to produce a second amplitude modulated (AM) waveform;
- a third modulator that is operative to modulate said second AM waveform onto said RF carrier to produce an AM RF carrier waveform;
- a second RF amplifier operating in its saturation region, and being operative to amplify said second AM RF carrier waveform to produce a second amplified AM RF carrier waveform having a second energy content in spectral sidelobes outside said intended limited bandwidth; and
- a combiner which is operative to combine said first amplified modulated RF carrier waveform and said second amplified AM RF carrier waveform to produce a composite modulated RF carrier waveform having a spectral characteristic in which said first and second energy contents of spectral sidelobes are suppressed.

14. An apparatus according to claim 13, wherein said second modulator is operative to amplitude-modulate a BPSK waveform beginning prior to and concluding after each transition of said BPSK waveform.

15. An apparatus according to claim 13, wherein said second modulator is operative to reduce the amplitude of a BPSK waveform beginning prior to and concluding after each transition of said BPSK waveform.

16. An apparatus for amplifying a binary phase shift keyed (BPSK) waveform that transitions between first and second phase values comprising:
- a first modulator that is operative to modulate said BPSK waveform onto an RF carrier to produce a BPSK-modulated RF carrier waveform;
- a first RF amplifier operating in its saturation region, and being coupled to amplify said BPSK-modulated RF carrier to produce an amplified BPSK-modulated RF carrier waveform;
- a second modulator that is operative to amplitude-modulate transition regions of said BPSK waveform to produce an amplitude modulated (AM)-BPSK waveform;
- a third modulator that is operative to modulate said AM-BPSK waveform onto said RF carrier to produce an AM-BPSK modulated RF carrier waveform;
- a second RF amplifier operating in its saturation region and being operative to amplify said BPSK modulated RF carrier to produce an amplified AM-BPSK modulated RF carrier waveform; and
- a combiner which is operative to combine said amplified BPSK modulated RF carrier waveform and said amplified AM-BPSK modulated RF carrier waveform to produce a composite modulated RF carrier waveform.

17. An apparatus according to claim 16, wherein said second modulator is operative to amplitude-modulate said BPSK waveform beginning prior to and concluding after each transition of said BPSK waveform.

18. An apparatus according to claim 16, wherein said second modulator is operative to reduce the amplitude of said BPSK waveform beginning prior to and concluding after each transition of said BPSK waveform.

* * * * *